United States Patent
Leidig

(10) Patent No.: US 9,052,031 B2
(45) Date of Patent: Jun. 9, 2015

(54) MAGNET CORE OF A MAGNET VALVE AS WELL AS A MAGNET VALVE

(71) Applicant: BUERKERT WERKE GMBH, Ingelfingen (DE)

(72) Inventor: Albert Leidig, Ilshofen (DE)

(73) Assignee: Buerkert Werke GMBH, Ingelfingen (DE)

( * ) Notice: Subject to any disclaimer, the term of this patent is extended or adjusted under 35 U.S.C. 154(b) by 13 days.

(21) Appl. No.: 14/038,112

(22) Filed: Sep. 26, 2013

(65) Prior Publication Data
US 2014/0091242 A1 Apr. 3, 2014

(30) Foreign Application Priority Data
Sep. 28, 2012 (DE) .................... 20 2012 009 367 U

(51) Int. Cl.
  *F16K 31/08* (2006.01)
  *F16K 31/06* (2006.01)
  *H01F 7/16* (2006.01)
  *H01F 7/08* (2006.01)

(52) U.S. Cl.
  CPC .............. *F16K 31/08* (2013.01); *F16K 31/0655* (2013.01); *F16K 31/0675* (2013.01); *F16K 31/0693* (2013.01); *H01F 7/1615* (2013.01); *H01F 2007/086* (2013.01)

(58) Field of Classification Search
  CPC . F16K 31/08; F16K 31/0675; F16K 31/0693; F16K 31/0655; H01F 7/1615; H01F 2007/086
  USPC ........ 251/129.07, 129.15, 129.19, 77, 48, 50; 335/257
  See application file for complete search history.

(56) References Cited

U.S. PATENT DOCUMENTS

| | | | | | |
|---|---|---|---|---|---|
| 1,587,921 | A | * | 6/1926 | Ray | 137/339 |
| 2,619,116 | A | * | 11/1952 | Ralston | 137/561 R |
| 2,735,644 | A | * | 2/1956 | Bishofberger | 251/77 |
| 2,861,594 | A | * | 11/1958 | Collins | 137/625.5 |
| 2,916,252 | A | * | 12/1959 | Hobbs et al. | 251/129.07 |

(Continued)

FOREIGN PATENT DOCUMENTS

| | | |
|---|---|---|
| DE | 69018 C | 5/1968 |
| DE | 1272664 B | 7/1968 |

(Continued)

OTHER PUBLICATIONS

German Search Report, 5 pgs, Apr. 4, 2013.

*Primary Examiner* — John Bastianelli
(74) *Attorney, Agent, or Firm* — McNees Wallace & Nurick LLC

(57) ABSTRACT

A magnet core of a magnet valve is guided in a core guiding tube of a solenoid so as to be axially shiftable, and cooperates at a first end face opposite a flow opening with a sealing system in such a manner that the flow opening is closed in a first end position and is open in a second end position. The magnet core is in flow communication with a valve space which is filled with a medium, in particular a medium of high viscosity. Around the circumference of the magnet core, a plurality of longitudinal grooves, extending in the direction of the longitudinal center line, extend toward the first end face, starting from a second end face opposite the first end face, the longitudinal grooves having at least a depth of 25% of the diameter of the magnet core. Further, a magnet valve comprising such a magnet core is described.

16 Claims, 3 Drawing Sheets

(56) References Cited

U.S. PATENT DOCUMENTS

| | | | |
|---|---|---|---|
| 3,523,676 A * | 8/1970 | Barker | 251/129.05 |
| 3,593,241 A * | 7/1971 | Ludwig | 335/262 |
| 3,827,672 A * | 8/1974 | Stampfli | 251/129.19 |
| 3,833,015 A * | 9/1974 | Kneuer | 137/334 |
| 4,082,116 A * | 4/1978 | Stampfli | 251/45 |
| 4,240,468 A * | 12/1980 | Brand et al. | 137/625.33 |
| 4,257,573 A | 3/1981 | Stampfli | |
| 4,418,848 A * | 12/1983 | Lunau | 222/504 |
| 4,634,096 A * | 1/1987 | Hara | 251/129.15 |
| 5,810,330 A * | 9/1998 | Eith et al. | 251/129.19 |
| 6,238,014 B1 * | 5/2001 | Tamai et al. | 303/119.2 |
| 2005/0001183 A1 * | 1/2005 | Hironaka | 251/50 |
| 2007/0273462 A1 | 11/2007 | Stehle | |
| 2010/0327199 A1 | 12/2010 | Linortner | |
| 2013/0292590 A1 | 11/2013 | Stahr | |

FOREIGN PATENT DOCUMENTS

| | | |
|---|---|---|
| DE | 2322669 A1 | 11/1973 |
| DE | 2540599 A1 | 1/1977 |
| DE | 2619772 A1 | 11/1977 |
| DE | 2912875 A1 | 10/1979 |
| DE | 4343118 A1 | 6/1995 |
| DE | 19848919 A1 | 4/2000 |
| DE | 10 2006 024 841 A1 | 11/2007 |
| DE | 10 2010 024 585 A1 | 12/2010 |
| DE | 10 2010 042 676 A1 | 4/2012 |
| GB | 1573278 A | 8/1980 |

\* cited by examiner

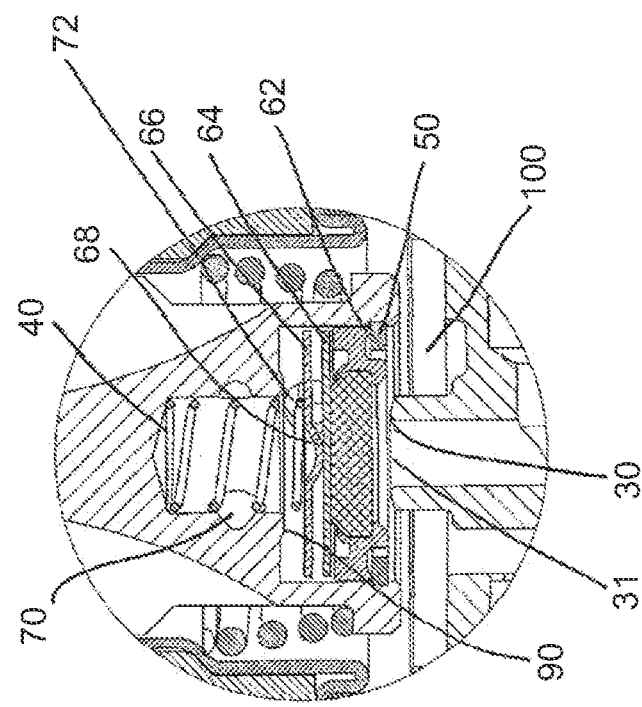
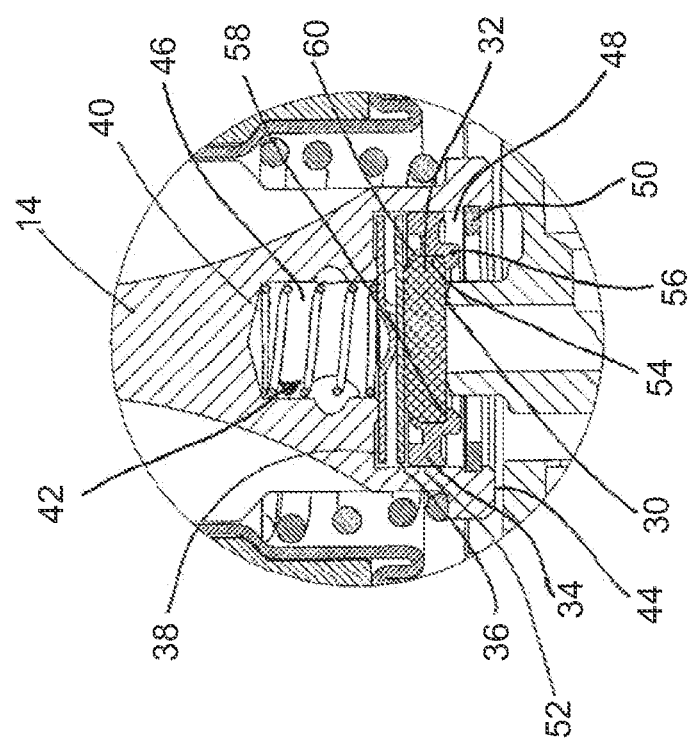

MAGNET CORE OF A MAGNET VALVE AS WELL AS A MAGNET VALVE

FIELD OF THE INVENTION

The invention relates to a magnet core of a magnet valve, which magnet core is guided in a core guiding tube of a solenoid so as to be axially shiftable, and cooperates at a first end face opposite a flow opening with a sealing system in such a manner that the flow opening is closed in a first end position and is open in a second end position. Further, the present invention relates to a magnet valve having a magnet core.

BACKGROUND

Magnet valves which are used in connection with highly viscous liquids, in particular in connection with oil burners, are exposed to high demands. Usual conditions are a medium pressure in the range of 30 bar and solenoid temperatures of approximately 165° C. with oils with a viscosity of approximately 75 cSt.

In view of pressures of 30 bar, it is not possible to use media-separated valves, i.e. valves comprising membranes. This means, however, that the valve space, in which the magnet core is moved during the switching of the valve, is filled with a medium and the magnet core is bathed in oil. During the switching procedure, when the magnet core is being attracted, the latter has to displace the oil from the valve space situated on the rear side of the magnet core. Highly viscous media, however, impede the moving of the magnet core, so that the movement is braked. During the attraction of the magnet core, the medium must be able to flow laterally past the magnet core into another portion of the valve space.

In the case of alternating voltage magnets, there is the aggravating factor that voltage peaks and voltage troughs alternate. If the magnet core cannot be quickly attracted during the switching procedure despite the solenoid being activated, so that the working gap is not closed, the solenoid current will consequently increase sharply. This may result in the solenoid being burned out.

In order to achieve better movability of a magnet core in an oil-based environment, it is known from DE 43 43 118 A to equip the magnet core with longitudinal grooves which allow the oil to better flow off from one portion into the other portion of the valve space during the switching procedure. In this process, however, the problem occurs that magnetic material is removed from the magnet core due to providing longitudinal grooves, weakening the magnetic force of the magnet valve. This is why magnet cores are known in the prior art, which have few grooves which are also not particularly deep, so as to avoid the loss of too much magnetic material.

Another solution for the designing of a magnet core is described in DE 10 2010 024 585 A. Here, the heat energy which is produced in the solenoid is supposed to be transferred to the oil to reduce its viscosity.

It is the object of the invention to provide a magnet core for a magnet valve, which allows effortless movability in viscous liquids and is distinguished by a high magnetic force.

SUMMARY

The present invention provides a magnet core of a magnet valve, the magnet core having a longitudinal center line, a first end face opposite a flow opening of the magnet valve and a second end face opposite the first end face. The magnet core is guided in a core guiding tube of a solenoid to be axially shiftable and cooperates at its first end face with a sealing system in such a manner that the flow opening is closed in a first end position and is open in a second end position. The magnet core is in flow communication with a valve space which is filled with a medium. Further, the magnet core has a plurality of longitudinal grooves arranged around its circumference, the grooves extending toward the first end face, starting from the second end face, the longitudinal grooves having a depth of at least 25% of the diameter of the magnet core.

Surprisingly, tests have clearly proven that the plurality of very deep grooves do not decrease the magnetic force at all or only to a small extent. The effect of the high number of grooves having a large depth can be explained with an effective reduction of detrimental eddy currents, which compensates for the reduction of the magnetic force.

The width of the grooves, which is preferably constant, e.g. amounts to at most 10% of the diameter of the magnet core.

The circumference of the magnet core may be provided with so many grooves that the sum of the groove widths is between 15 and 25% of the circumferential length of the magnet core.

Further, at least six, preferably at least eight grooves should be provided.

The magnet core can comprise first and second longitudinal grooves, the first longitudinal grooves having a greater depth than the second longitudinal grooves. This variation of the groove depth allows the optimizing of the adaptation of the magnetic force and the cross-sectional area.

The second longitudinal grooves should adjoin two first longitudinal grooves, whereas it would also be possible to provide a plurality of first or second longitudinal grooves next to each other which are then adjacent to second and first longitudinal grooves, respectively.

The first and second longitudinal grooves may alternate in circumferential direction.

Further, the depth of the longitudinal grooves can decrease toward the first end face. In this area, a valve space laterally adjoins the magnet core in the magnet valve already, so that the fluid, which is present at the rear side of the magnet core and has to be displaced forward, can exit the grooves radially.

Adjacent to the first end face, the magnet core may comprise a surrounding constriction for receiving a spring biasing the magnet core in one direction.

At the transition from the constriction to the first end face, a shoulder should be formed on the magnet core as a contact surface for the spring.

The longitudinal grooves may end axially before reaching the first end face, in particular in the area of the constriction. The constriction could have a smaller depth than the grooves. In the installed state, the fluid thus flows from the grooves into the constriction and between the windings of the spring.

In the area of the constriction, two axially spaced, and, optionally, also circumferentially spaced, transverse holes may be arranged, which penetrate the magnet core and through which the fluid can pass.

According to one option, a recess for receiving a sealing system is arranged on the first end face. This sealing system is especially designed such that the sealing element, which is moved against a sealing seat, is housed in the recess so as to be axially movable.

Any manufacturing tolerances will be reduced by the movable sealing system comprising a movable sealing element which is capable of resting on the sealing seat. Further, it will be ensured that in the case of attraction forces that are too low or very low for lifting off the sealing element by moving the magnet core, the sealing seat will not be unblocked yet, rather, this should not happen until there is an attraction force which is clearly great enough.

The recess may comprise two merging portions with different diameters, which have various functions and accommodate different parts.

Each one of the transverse holes may end in one of the recesses with different diameters, so that the respective portion of the recess is fluidly connected to the valve space toward outside, and the transverse hole serves as an inflow or outflow channel for fluid which is present at the rear side in the recess or has to flow into it.

The invention further relates to a magnet valve comprising a solenoid and a magnet core according to the invention, which can be switched by the solenoid. The magnet valve further comprises a flow opening surrounded by a valve seat and to be opened and closed by the movement of the magnet core.

The valve is designed such that the fluid may flow via the grooves toward the second end face during the opening process of the valve. An annular space can be provided for the spring biasing the magnet core toward the valve seat, the grooves opening into said annular space at their end near the valve seat.

The magnet core has its first end face provided with a recess in which an axially biased sealing system is inserted, which provides for a closing of the valve even with already low attraction forces of the solenoid.

Transverse holes in the magnet core should open into the recess, i.e. preferably one transverse hole at the rear side of the sealing element and/or another transverse hole at the side of a washer assigned to the sealing element, so that the recess does not form a closed-up cavity at the rear side of the sealing element and/or of the assigned washer.

BRIEF DESCRIPTION OF THE DRAWINGS

FIG. 2 is an enlarged sectional view through the magnet valve of the invention in the area of the sealing system according to the invention, with a closed valve seat, FIG. 3 is an enlarged detail view of the sealing system according to the invention, corresponding to FIG. 2 and with an opened valve seat.

DETAILED DESCRIPTION

Figure 1:
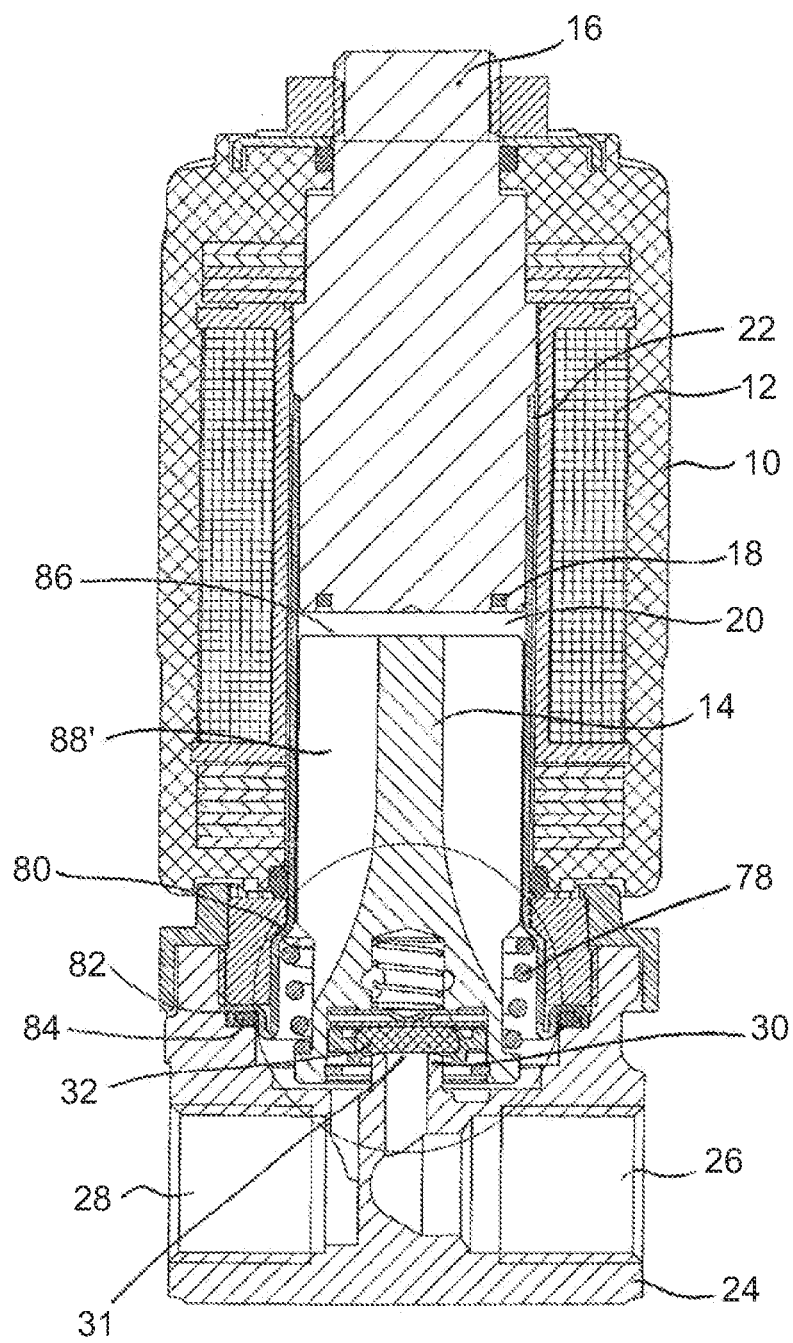
FIG. 1 is a longitudinal sectional view through a magnet valve for an oil burner, according to the invention.

FIG. 1 illustrates a magnet valve which has a flow of highly viscous oil therein and is used for the metering of oil for oil burners.

The magnet valve comprises a housing 10 including an electric solenoid 12 for moving an actuation element 14 which in the present case is implemented as a magnet core. In the following, however, the magnet core is always referred to as an actuation element for simplification. By means of the solenoid 12, the actuation element 14 can be moved in axial direction.

Provided in the interior of the housing 10 is a cavity which is partially surrounded by the solenoid 12 and is closed in one axial direction with a plug 16 made of a ferromagnetic material. In case the magnet valve is operated with an alternating voltage, an alternating voltage ring 18 made of copper or silver is housed at the end face in the plug 16.

The actuation element 14 is situated in a so-called valve space which is filled out in part by the actuation element 14, but in the closed position of the magnet valve shown in FIG. 1 comprises a gap 20 between the plug 16 and the actuation element 14.

What is known as a core guiding tube 22 is provided interiorly on the housing 10 and lines the valve space radially toward outside. The guiding tube 22 serves as a sliding guide surface for the actuation element 14 sliding along it.

The oil flows through a valve body 24 on which the housing 10 is placed too. The valve body has a first opening 26 as well as a second opening 28, between which a connection duct comprising a valve seat 30 is present, the latter closing the connection duct when the valve is closed, and unblocking the valve seat 30 and hence opening the connection duct when the valve is open. The valve seat 30 is an annular surface, preferably a freely terminating wall with a flow opening 31 forming a part of the connection duct and surrounded by the valve seat 30. A sealing element 32 may touch down on the valve seat 30 and close it.

The sealing element 32 is made of an elastomeric material, in particular of PTFE, PCTFE or PEEK.

The sealing element 32 is a part of a sealing system which can be seen more clearly in FIGS. 2 and 3 and comprises a sealing retainer 34, a first washer 36, a second washer 38, as well as a spring element 40, which are all housed in a recess 42 in the actuation element 14. The recess 42 starts at an end face 44 of the actuation element 14 near the valve seat 30 and is configured as a blind hole.

The sealing retainer 34 and the sealing element 32 constitute a pre-assembled unit and a sealing disc.

The recess 42 has a first portion 46 which is distant from the end face 44 and has a smaller diameter, and a second portion 48 adjoining the first portion 46 toward the end face 44 and having a larger diameter.

The two portions 46, 48 merge into each other.

The spring element 40 is housed in the first portion, so that this portion serves as a receiving space for the spring element 40.

The sealing retainer 34, the sealing element 32, and the two washers 36, 38 are housed in the second portion 48.

In order to prevent the sealing system from axially moving out of the recess 42, a snap ring 50 is provided in the area of the recess 42 and also serves as an axial stop for the axially movable sealing retainer 34.

As shown in FIG. 2, the sealing retainer 34 is implemented as a ring sliding within the circular cylindrical recess 42. To this end, the sealing retainer 34 has a radially outer circumferential surface 52 which rests against an inner side, serving as a running surface, of the actuation element 14 in the area of the portion 48, and slides along it.

The annular sealing retainer 34 has its inner side provided with an inner surface 54 which preferably has a sealing contact with the circumferential edge of the sealing element 32 and surrounds the latter.

At its end near the valve seat 30, the inner surface 54 ends in a preferably continuously surrounding bead 56 which protrudes radially inwards. The bead 56 is an integral component of the sealing retainer 34 and has a preferably planar contact surface 58 for the axial abutment of the sealing element 32.

The sealing element 32 is clamped between the bead 56 and a retaining projection 60 of the sealing retainer 34, projecting radially inward. The retaining projection 60 is formed by a thin, web-like wall of the sealing retainer 34, the former being crimped around the edge of the sealing element 32 so that an axial clamping is produced.

On the end face near the valve seat 30, the sealing retainer 34 has a preferably continuously surrounding, axially projecting extension 62 which is extremely narrow and, as can be seen in FIG. 3, rests against the snap ring 50 in the opened position of the valve. Thus, the extension 62 serves as a contact surface in what is referred to as the second end position (open position) of the valve. The extension 62 terminates in a radial plane in which the contact surface 58 of the bead 56 is situated, too.

A first washer 64 (see FIG. 3) has full-area contact with the end face of the sealing element 32 distant from the sealing seat 30.

The rear side of the first washer 64 rests on a second washer 66, preferably only with punctiform contact substantially, as the second washer 66 has a central bulge 68. Said bulge makes provision that there is a central introduction of force through the spring element 40, allowing uniform displacement of the sealing system. The first washer 64 provides for a uniform introduction of force into the sealing element 32 and prevents the sealing element 32 from being deformed at the rear side by the force of the spring 40 during use.

As already mentioned, the spring element 40 biases the sealing element, more precisely the rest of the sealing system, toward the valve seat 30.

As is shown in FIGS. 2 and 3, the valve seat 30 is designed such that in the closed state of the valve it can be closed by the sealing element 32, with the sealing retainer 34 radially surrounding the valve seat 30 with a clearance, so that only the sealing element 32 rests against the valve seat 30.

The sealing retainer 34 and/or one or both of the two washers 64, 66 are preferably made of metal.

The radial positions of the bead 56 and the snap ring 50 are adapted to each other such that the bead 56 does not make contact with the snap ring 50 independently of the position of the valve, but in the opened state (see FIG. 3) sinks into the cavity surrounded by the snap ring 50 and rests against the snap ring 50 only with the axial extension 62.

Figure 4:
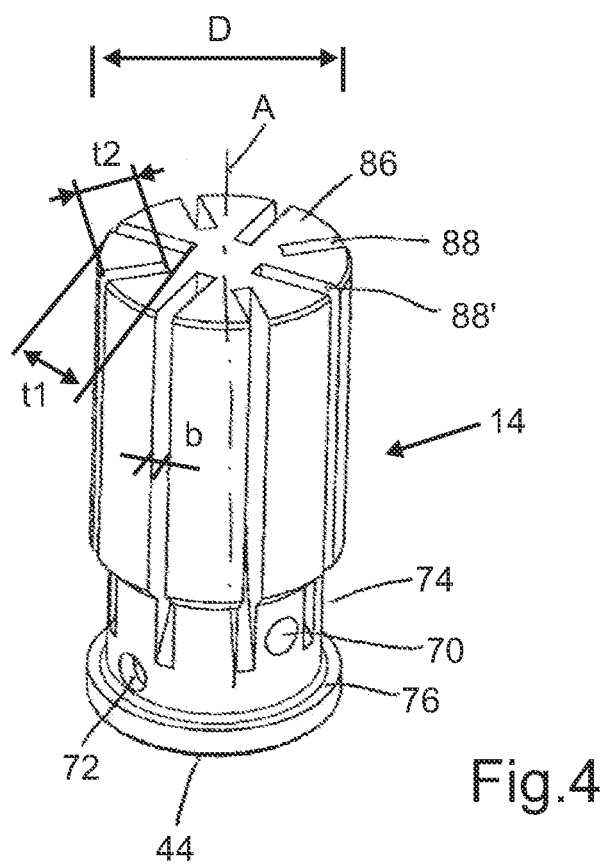
FIG. 4 is a perspective view of the magnet core according to the invention, used in the magnet valve of the invention.
Figure 5:
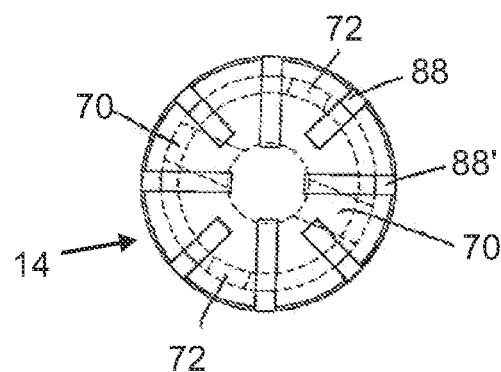
FIG. 5 is a top view of the magnet core according to FIG. 4.

As can also be seen in FIG. 4, the actuation element 14 preferably has two radial transverse holes 70, 72, which are axially spaced and preferably also circumferentially spaced from each other and in the present case are implemented as through-holes. The transverse hole 70, which can also be seen in FIGS. 2 and 3, opens into the portion 46 of the recess 42, and the transverse hole 72 opens into the portion 48.

Preferably, the transverse hole 72 has such a position that it will always be open toward the recess 42 at the rear side of the sealing element 32.

Near its end face 44 opposite the valve seat, the actuation element 14 comprises a surrounding constriction 74 terminating in a shoulder 76 and serving for receiving a spring 78 (see FIG. 1). The spring is supported by the shoulder 76 on the one hand, and by a shoulder 80 on the other hand, the latter being formed by a widened portion of the tube 22.

The tube 22 is widened toward the valve seat 30 and ends in a flange wall 82 (see FIG. 1) which is bent several times in U-shaped fashion, with a sealing 84 toward the valve body 24 being housed in one "U".

Apart from the end face 44, referred to as the first end face, the actuation element 14, here the magnet core, has an opposite, second end face 86.

Starting from the second end face 86, a plurality of preferably radially extending grooves 88, 88' are provided in the actuation element 14, running along the central axis A of the substantially circular cylindrical actuation element 14.

The grooves 88, 88', however, do not extend up to the second end face 44 and end ahead of it, in particular in the area of the constriction 74.

The grooves 88, 88' form longitudinal grooves whose depth T is equal to at least 25% of the diameter D of the actuation element 14, said diameter D and the depth being measured in the area of the solenoid 12.

There are longitudinal grooves with differing depths, i.e. longitudinal grooves 88 with a groove depth $t2$ which is smaller than the groove depth $t1$ of the grooves 88'. The grooves 88' are referred to as first longitudinal grooves and the grooves 88 are referred to as second longitudinal grooves. Both grooves 88 and 88' extend axially preferably by the same distance and they both start at the second end face 86.

The groove depth $t2$ also amounts to at least 25% of the magnet core diameter D.

The first and second longitudinal grooves 88, 88' alternate in circumferential direction; here, it would also be possible to provide two or more neighboring first longitudinal grooves 88', for instance, and to provide a second longitudinal groove 88 between groups of first longitudinal grooves 88'.

The groove width b is preferably the same for the two longitudinal grooves 88, 88' and further preferably amounts to at most 10% of the diameter D.

In the exemplary embodiment which is shown, the diameter D is 19 mm, and four longitudinal grooves 88 and four longitudinal grooves 88' are provided in an alternating manner. The depth of the longitudinal grooves is 5 and 6.75 mm, respectively, the groove width is only 1.5 mm.

Due to the large number of the grooves 88, 88' of considerable depth, an effective reduction of detrimental eddy currents can be achieved.

The position of the spring 78 in the area of the constriction 74 ensures that only a small amount of material has to be removed from the actuation element 14 in order to serve for housing the spring 78. With previous embodiments, recesses for housing the spring 78 were provided in the area of the second end face 86, which, however, resulted in considerable reduction of the magnetic force.

As shown in FIGS. 1 to 3, the depth of the longitudinal grooves 88' as well as that of the longitudinal grooves 88 decreases toward the second end face 44 and, as it were, peters out in the area of the constriction 74.

The magnet valve and the sealing system according to the invention have some crucial advantages.

On the one hand, the elastic sealing element 32 does not rub along the inner side of the recess 42 and thus is not subject to considerable wear. What is more, the friction is reduced owing to the material combination metal/metal between the sealing retainer 34 and the actuation element 14.

Further, the very small contact surfaces between the sealing retainer 34 and the snap ring 50 ensure that there is no sticking of the sealing system if the latter is used after a prolonged rest period, as there is thick oil in this area due to the absence of media separation. Incidentally, this purpose is also served by a surrounding and projecting extension 90 on the end wall between the first and second portions 46, 48 of the recess 42, since the extension 90 serves as a stop for the washer 38 (see FIG. 3).

Furthermore, in case there is a radial gap between the sealing retainer and the inner side of the recess 42, it is possible to even achieve a floating-type support of the sealing system in the actuation element 14.

As the sealing system is received in the actuation element 14 so as to be axially shiftable, the medium present in the recess 42 at the rear side of the sealing element 32 must be able to flow into and out of the recess 42, which is made possible by means of the transverse holes 70, 72. Thus, the recess 42 is always filled with oil, as are the areas between the washers 64, 66.

The mode of operation of the magnet valve will be explained in the following.

In the initial position, if the solenoid 12 does not carry any current, the spring 78 pushes the actuation element 14 toward the valve seat 30, so that the sealing element 32 has sealing contact with the valve seat 30.

Any tolerances in the longitudinal direction are compensated for by the spring element 40, which provides for an additional contact force.

If current is made to flow through the solenoid for the purpose of opening the valve, the solenoid 12 attracts the magnet core, here the actuation element 14. The actuation element 14 will be moved upward by a small amount first, with the sealing element 32 still being held against the sealing seat 30 by the spring element 40 during this initial motion. The sealing element 32 will not lift off from the sealing seat 30 (see FIG. 3) until the sealing retainer 34 rests against the snap ring 50 which serves as a stop in this case. Then, a medium is allowed to flow through the flow opening 31 and the connection duct, so that the openings 26, 28 are fluidly connected to each other.

In order to permit the movement of the actuation element 14 into the solenoid, the medium, here the thick oil present between the end face 86 and the plug 16, has to be displaced. This displacing of the oil is effected by the longitudinal grooves 88, 88', so that the oil flows toward the end face 44, in the area of the widened portion of the tube 22 where, so to speak, a transition to an annular space 100 (FIG. 3) is present, which is situated radially outside the valve seat 30 and in the opened state is fluidly connected to the flow opening 31.

In the course of moving the sealing element 32 within the actuation element 14 relative to the latter in a downward direction (i.e. from the closed state to the open state), said movement causes oil to be drawn into the recess 42 via the transverse holes 70.

When the actuation element 14 is moved to the closed state, oil is conveyed back into the gap 20 via the longitudinal grooves 88, 88'.

Figure 6:
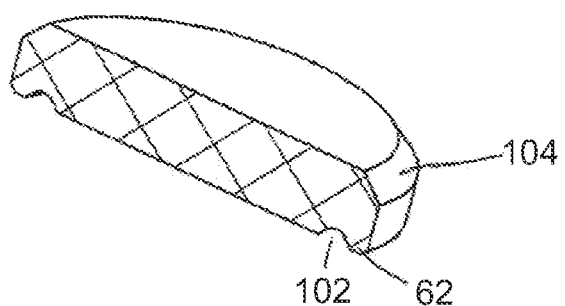
FIG. 6 is a cross-sectional view through a one-piece embodiment of the sealing disc.

In the embodiment according to FIG. 6, the sealing disc is formed in one piece and consists of PTFE, PCTFE or PEEK. The sealing disc has a cylindrical basic shape originally, but a circumferentially closed circumferential flute 102 and a recess, which is provided at the outer circumference and has the shape of a chamfer 104, are provided for reducing the contact areas, reducing the circumferential contact area in the recess by at least 25%. The circumferential flute 102 separates the extension 62 serving as a stop. In other respects, however, the sealing disc may form an alternative to the unit made up of sealing retainer and sealing element, so that reference can be made to the other drawings.

The invention claimed is:

1. A magnet core of a magnet valve, said magnet core having a longitudinal center line, a first end face opposite a flow opening of the magnet valve and a second end face opposite the first end face, the magnet core being guided in a core guiding tube of a solenoid to be axially shiftable and cooperating at its first end face with a sealing system in such a manner that the flow opening is closed in a first end position and is open in a second end position, the magnet core being in flow communication with a valve space which is filled with a medium, wherein the magnet core has a plurality of longitudinal grooves arranged around its circumference, the grooves extending toward the first end face, starting from the second end face, each longitudinal groove having a depth of at least 25% of the diameter of the magnet core, wherein the magnet core comprises first and second longitudinal grooves, the first longitudinal grooves having a greater depth than the second ones.

2. The magnet core for a magnet valve according to claim 1, wherein the second longitudinal grooves are each adjacent to two first longitudinal grooves.

3. The magnet core for a magnet valve according to claim 2, wherein the first and second longitudinal grooves alternate in a circumferential direction.

4. The magnet core for a magnet valve according to claim 1, wherein the depth of the longitudinal grooves decreases toward the first end face.

5. The magnet core for a magnet valve according to claim 1, wherein the magnet core, adjacent to the first end face, comprises a surrounding constriction for receiving a spring.

6. The magnet core for a magnet valve according to claim 5, wherein a shoulder as a contact surface for the spring is formed at the transition from the constriction to the first end face of the magnet core.

7. The magnet core for a magnet valve according to claim 5, wherein the longitudinal grooves end axially in the area of the constriction and before reaching the first end face.

8. The magnet core for a magnet valve according to claim 5, wherein the constriction has a smaller depth than the longitudinal grooves.

9. The magnet core for a magnet valve according to claim 1, wherein the longitudinal grooves end axially before reaching the first end face.

10. The magnet core for a magnet valve according to claim 1, wherein a recess for receiving the sealing system is arranged at the first end face.

11. The magnet core for a magnet valve according to claim 10, wherein the recess comprises two portions which have differing diameters and merge into each other.

12. A magnet core of a magnet valve, said magnet core having a longitudinal center line, a first end face opposite a flow opening of the magnet valve and a second end face opposite the first end face, the magnet core being guided in a core guiding tube of a solenoid to be axially shiftable and cooperating at its first end face with a sealing system in such a manner that the flow opening is closed in a first end position and is open in a second end position, the magnet core being in flow communication with a valve space which is filled with a medium, wherein the magnet core has a plurality of longitudinal grooves arranged around its circumference, the grooves extending toward the first end face, starting from the second end face, each longitudinal groove has a depth of at least 25% of the diameter of the magnet core, wherein the magnet core, adjacent to the first end face, comprises a surrounding constriction for receiving a spring, wherein two axially spaced transverse holes are arranged in the area of the constriction and protrude into the magnet core.

13. The magnet core for a magnet valve according to claim 12, wherein at least one transverse hole opens into each portion of the recess.

14. A magnet valve comprising a solenoid, a magnet core capable of being switched by the solenoid, and a flow opening which is surrounded by a valve seat and to be opened and closed by the movement of the magnet core, the magnet core having a longitudinal center line, a first end face opposite the flow opening of the magnet valve and a second end face opposite the first end face, the magnet core being guided in a core guiding tube of the solenoid to be axially shiftable and cooperating at its first end face with a sealing system in such a manner that the flow opening is closed in a first end position and is open in a second end position, the magnet core being in flow communication with a valve space which is filled with a medium, wherein the magnet core has a plurality of longitudinal grooves arranged around its circumference, the grooves extending toward the first end face, starting from the second end face, each longitudinal groove having a depth of at least 25% of the diameter of the magnet core, wherein the valve is designed such that fluid can flow via the longitudinal grooves to the first end face during the opening process of the valve, wherein the magnet core comprises a recess at the first end face, an axially biased sealing system being housed in said recess, and wherein a transverse hole in the magnet core opens into the recess at the rear side of a sealing element of the sealing system.

15. The magnet valve according to claim 14, wherein the valve is an oil burner magnet valve and wherein the valve space is filled with oil.

16. A magnet valve comprising a solenoid, a magnet core capable of being switched by the solenoid, and a flow opening which is surrounded by a valve seat and to be opened and closed by the movement of the magnet core, the magnet core having a longitudinal center line, a first end face opposite the flow opening of the magnet valve and a second end face opposite the first end face, the magnet core being guided in a core guiding tube of the solenoid to be axially shiftable and cooperating at its first end face with a sealing system in such a manner that the flow opening is closed in a first end position and is open in a second end position, the magnet core being in flow communication with a valve space which is filled with a medium, wherein the magnet core has a plurality of longitudinal grooves arranged around its circumference, the grooves extending toward the first end face, starting from the second end face, each longitudinal groove having a depth of at least 25% of the diameter of the magnet core, wherein the valve is designed such that fluid can flow via the longitudinal grooves to the first end face during the opening process of the valve, wherein the magnet core comprises a recess at the first end face, an axially biased sealing system being housed in said recess, and wherein a transverse hole opens into the recess at a side of a washer arranged within the recess which side is facing the sealing element.

* * * * *